United States Patent
Baltes et al.

(10) Patent No.: US 8,881,308 B2
(45) Date of Patent: Nov. 4, 2014

(54) METHOD TO ENABLE DEVELOPMENT MODE OF A SECURE ELECTRONIC CONTROL UNIT

(75) Inventors: Kevin M. Baltes, Wixom, MI (US);
Ansaf I. Alrabady, Livonia, MI (US);
Thomas M. Forest, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/612,165

(22) Filed: Sep. 12, 2012

(65) Prior Publication Data
US 2014/0075579 A1 Mar. 13, 2014

(51) Int. Cl.
| | | |
|---|---|---|
| G06F 21/00 | (2013.01) | |
| G06F 9/445 | (2006.01) | |
| G06F 21/64 | (2013.01) | |
| G06F 21/51 | (2013.01) | |
| G06F 9/44 | (2006.01) | |
| G06F 1/24 | (2006.01) | |

(52) U.S. Cl.
CPC ............ G06F 21/64 (2013.01); *G06F 21/51* (2013.01); *G06F 9/4401* (2013.01); G06F 8/61 (2013.01); *G06F 1/24* (2013.01); *G06F 9/4411* (2013.01)
USPC ........ 726/30; 726/32; 713/1; 713/2; 717/124; 717/174

(58) Field of Classification Search
None
See application file for complete search history.

(56) References Cited

U.S. PATENT DOCUMENTS

| | | | | |
|---|---|---|---|---|
| 7,069,452 | B1* | 6/2006 | Hind et al. | 713/1 |
| 7,610,491 | B1* | 10/2009 | Tsao | 713/184 |
| 7,623,875 | B2* | 11/2009 | Alrabady | 455/456.4 |
| 2011/0087870 | A1* | 4/2011 | Spangler et al. | 713/2 |
| 2011/0179195 | A1* | 7/2011 | O'Mullan et al. | 710/16 |

OTHER PUBLICATIONS

Nilsson, D. K., Sun, L., and Nakajima, T., A Framework for Self-Verification of Firmware Updates over the Air in Vehicle ECUs, 2008 IEEE GLOBECOM Workshops, pp. 1-5, Nov. 30-Dec. 4, 2008.*

* cited by examiner

*Primary Examiner* — Jung Kim
*Assistant Examiner* — Janusz Kusyk
(74) *Attorney, Agent, or Firm* — John A. Miller; Miller IP Group, PLC

(57) ABSTRACT

A system and method for installing software on a secure controller without requiring the software to be properly signed. The method includes determining whether a by-pass flag has been set in the controller that identifies whether a file validation procedure is required to install the file and performing a pre-check operation to determine whether predetermined parameters of the file have been satisfied. The method also includes installing the file into a memory in the controller if the pre-check operation has been satisfied. The method further includes determining whether the file has a proper signature and indicating that the signature is proper if the by-pass flag is set and the file does not include a proper signature, and allowing the file to be installed if the signature has been indicated as being proper.

18 Claims, 5 Drawing Sheets

METHOD TO ENABLE DEVELOPMENT MODE OF A SECURE ELECTRONIC CONTROL UNIT

BACKGROUND OF THE INVENTION

1. Field of the Invention

This invention relates generally to a system and method for installing software on a controller that does not require the software to include an authorized security code and, more particularly, to a system and method for installing developmental software on a production vehicle electronic control unit (ECU) that does not require the software to be signed.

2. Discussion of the Related Art

Most modern vehicles include electronic control units (ECUs), or controllers, that control the operation of vehicle systems, such as the powertrain, climate control system, infotainment system, body systems, chassis systems, and others. Such controllers require special purpose-designed software in order to perform the control functions. With the increasing number and complexity of these controllers, and the growing threat posed by developers of malicious software, it is more important than ever to authenticate the source and content of binary files that are loaded on automotive controllers. The consequences of using software that is not properly validated, or worse, maliciously-designed, in a vehicle controller include unintended behavior of the vehicle or its systems, loss of anti-theft features on the vehicle, potential tampering with components such as the odometer, and loss of other vehicle features and functions.

One known digital coding technique is referred to as asymmetric key cryptography that uses digital signatures for authenticating files that are programmed into controllers. As would be well understood by those skilled in the art, asymmetric key cryptography uses a pair of mathematically-related keys, known as a private key and a public key, to encrypt and decrypt a message. To create a digital signature, a signer uses his private key, which is known only to himself, to encrypt a message. The digital signature can later be decrypted by another party using the public key, which is paired to the signer's private key.

Flashing is a well known process for installing software files, calibration files and/or other applications into a flash memory of a vehicle ECU or other programmable device. A bootloader is an embedded software program loaded on the ECU that provides an interface between the ECU and a programming device that is flashing the file. The bootloader may employ asymmetric key cryptography and stores a public key that must be used to decode the digital signature transferred by the programming device before allowing the ECU to execute the software file or calibration file.

When developing and testing new versions of software and calibration files, it is usually desirable to employ a production controller already flashed with existing files as a less expensive alternative to providing a specialized controller for developmental purposes only. When installing developmental software files in a production controller, the file must be properly signed or otherwise authenticated before the ECU will allow the file to be installed. Requiring an authorized user to sign developmental software files and calibration files requires significant effort, time and resources. However, if it is relatively easy to install developmental software files into an ECU that includes by-passing the signature requirement to authenticate a file for an authorized user, then it becomes easier for a hacker to also put the ECU in a configuration to not require the signature. Thus, it would be desirable to provide a secure procedure where a production controller that is being used to test developmental software be instructed to not require a signature to flash that software, but still be secure enough to prevent potential hackers from performing the same operation.

If a large number of production controllers exist for a particular module on a vehicle and a technique was developed to flash developmental software onto one of those controllers for testing and development purposes, if that technique ever was released outside of the secure development environment, all of those production controllers could then be vulnerable to that risk. Thus, the technique for instructing a controller to accept developmental software that is not signed for a particular controller of one type needs to be secure enough to prevent a potential hacker from gaining access to that controller, and also needs to be secure enough where if the potential hacker did gain access to that technique for that controller, that technique would not be usable on all of the other controllers of the same type.

SUMMARY OF THE INVENTION

In accordance with the teachings of the present invention, a system and method are disclosed for installing software on a secure controller without requiring the software to be properly signed. The method includes using a by-pass flag in the controller that identifies whether a file validation procedure is required to install the file. The method also includes performing a pre-check operation to determine whether predetermined parameters of the file have been satisfied. The method also includes installing the file into a memory in the controller if the pre-check operation has been satisfied. The method further includes determining whether the file has a proper signature and indicating that the signature is proper if the by-pass flag is set. The file is allowed to be installed if the signature has been indicated as being proper.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for installing software on a controller without the software having to be signed is merely exemplary in nature and is in no way intended to limit the invention or its applications or uses. For example, the technique discussed herein has particular application for a vehicle ECU. However, as will be appreciated by those skilled in the art, the technique may have application for other controllers.

Figure 1:
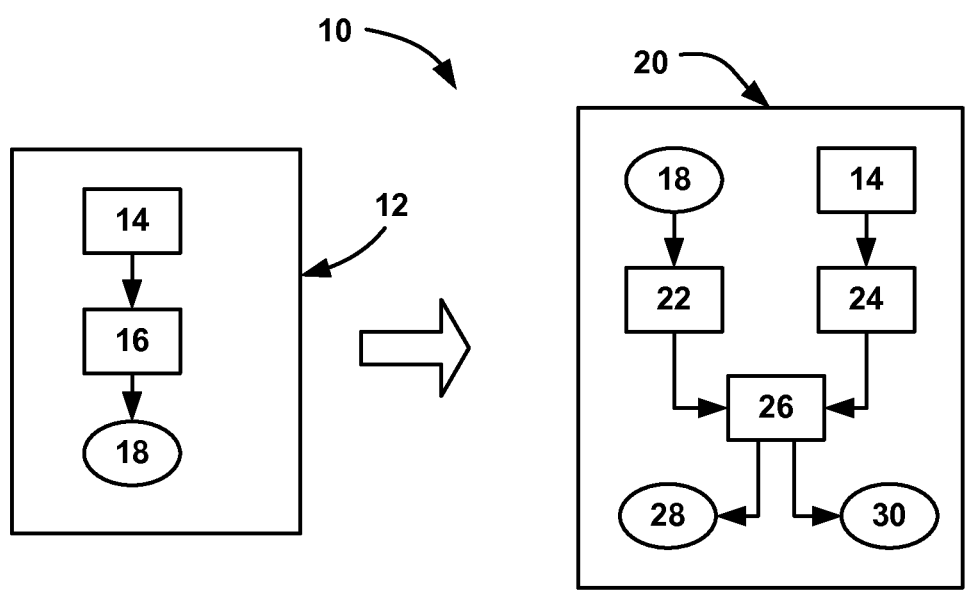
FIG. 1 is a schematic block diagram showing a process for verifying a digital signature.

FIG. 1 is a block diagram 10 of a known method for using asymmetric key digital signatures for authenticating files that are programmed into controllers. As would be understood by those skilled in the art, asymmetric key cryptography uses a pair of mathematically-related keys known as a private key and a public key to encrypt and decrypt a message. To create a digital signature, a signer uses his private key, which is known only to himself, to encrypt a digital message. The digital signature can later be decrypted by another party using the public key that is paired to the signer's private key to authenticate a file or message.

In a signing step 12, a content file 14 is provided, where the content file 14 could be a piece of software, a calibration file, or other "soft-part" content to be used in a controller. A hash calculation is performed on the content file 14 to produce a hash value 16 of the content file 14. The hash value 16 is then encrypted with the signer's private key to produce a digital signature 18, where the digital signature 18 is only good for that particular content file.

The digital signature 18 and the content file 14 are then used in a verifying step 20, which would be performed by the bootloader in the ECU in the application being discussed herein. The digital signature 18 is decrypted using the signer's public key to produce a decrypted hash value 22. Meanwhile, a hash calculation is performed on the content file 14 by the verifier, to produce a calculated hash value 24. At box 26, the decrypted hash value 22 is compared to the calculated hash value 24. If the decrypted hash value 22 matches the calculated hash value 24, then a valid determination is issued at oval 28, and the content file 14 is used. If the decrypted hash value 22 does not match the calculated hash value 24, then an invalid determination is issued at oval 30, and the content file 14 is not used.

Figure 2:
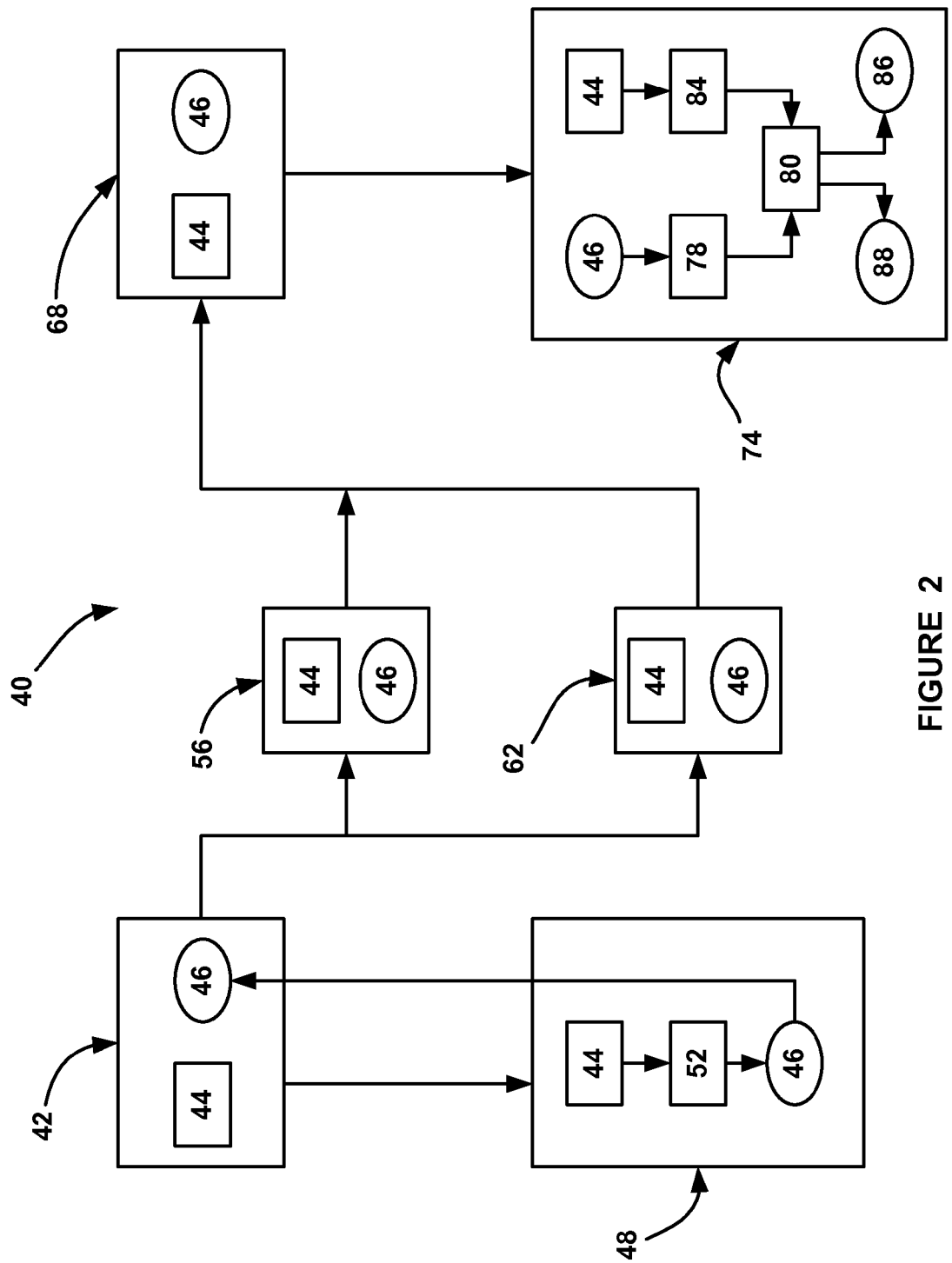
FIG. 2 is a block diagram of a method for signing and verifying electronic content using a digital signature including the delivery of content and signature files from programming source to executing controller.

FIG. 2 is a block diagram 40 showing a method for signing and verifying electronic content using a digital signature, including the delivery of content and signature files from a programming source to an executing controller. A file repository 42 stores a software executable, a calibration file or other "soft-part" file, collectively known as a content file 44. The content file 44 is typically a binary file. It is desired to obtain a digital signature 46 for the content file 44. In order for the content file 44 to be digitally signed, the content file 44 is provided to a signing server 48. On the signing server 48, a hash calculation is performed on the content file 44 to produce a hash value 52. The hash value 52 is encrypted using the private key stored on the signing server 48, where the encryption produces the digital signature 46. The digital signature 46 is then provided back to the repository 42.

At this point, the content file 44 and the digital signature 46 both exist in the repository 42. The challenge is then to deliver the content file 44 and the digital signature 46 through the various business systems used by the automotive manufacturer and install and validate the content file 44 on a controller in a vehicle. In general, an automotive manufacturer will have at least two organizations or departments responsible for installing software and calibration files on controllers in vehicles, namely, manufacturing and service. FIG. 2 shows a manufacturing database 56, used by the automotive manufacturer's manufacturing department for managing electronic files which are installed as "parts" in production vehicles. FIG. 2 likewise shows a service database 62, used by the auto manufacturer's service department for managing electronic files which are installed as "service parts" in vehicles that are worked on in a service facility. As shown in FIG. 2, the manufacturing database 56 and the service database 62 both receive copies of the content file 44 and the digital signature 46 to be used for the respective functions of the manufacturing and service departments.

In order to actually install the content file 44 on a controller in a vehicle, a programming tool 68 is used. As shown, the programming tool 68 also receives a copy of the content file 44 and the digital signature 46. That is, the manufacturing department could provide the content file 44 and the digital signature 46 from the manufacturing database 56 to the programming tool 68 for installation on a new production vehicle, or the service department could provide the content file 44 and the digital signature 46 from the service database 62 to the programming tool 68 for installation on a vehicle being serviced.

The next step is for the programming tool 68 to install the content file 44 on a controller in a vehicle. ECU 74 is the controller that will actually use the content file 44. Following is a brief discussion of the architecture of the ECU 74. The software on the ECU 74 consists of a bootloader, a software executable, and one or more calibration files. For the purposes of this discussion, the ECU 74 is assumed to have a single central processing unit (CPU). In actual vehicles, the ECU 74 could have multiple CPUs, and each CPU would have a bootloader, a software executable, and one or more calibration files.

The bootloader in the ECU 74 is responsible for validating and installing new software files and calibration files. Thus, the functions described in this paragraph are performed by the bootloader in the ECU 74. The programming tool 68 provides the content file 44 and the digital signature 46 to the ECU 74. The digital signature 46 is decrypted by the bootloader using the public key of the repository 42 to produce a decrypted hash value 78. The public signing key may be resident in the ECU 74 or be provided to the ECU 74 in conjunction with the content file 44 and digital signature 46. Meanwhile, a hash calculation is performed on the content file 44 by the bootloader to produce a calculated hash value 84. At box 80, the decrypted hash value 78 is compared to the calculated hash value 84. If the decrypted hash value 78 matches the calculated hash value 84, then a valid determination 88 is issued, and the content file 44 is used. If the content file 44 to be used is a software executable, the bootloader installs it as the new software executable on the ECU 74. If the content file 44 to be used is a calibration file, the bootloader installs it as one of the one or more calibration files on the ECU 74. If the decrypted hash value 78 does not match the calculated hash value 84, then an invalid determination 86 is issued, and the content file 44 is not used on the ECU 74.

Figure 3:
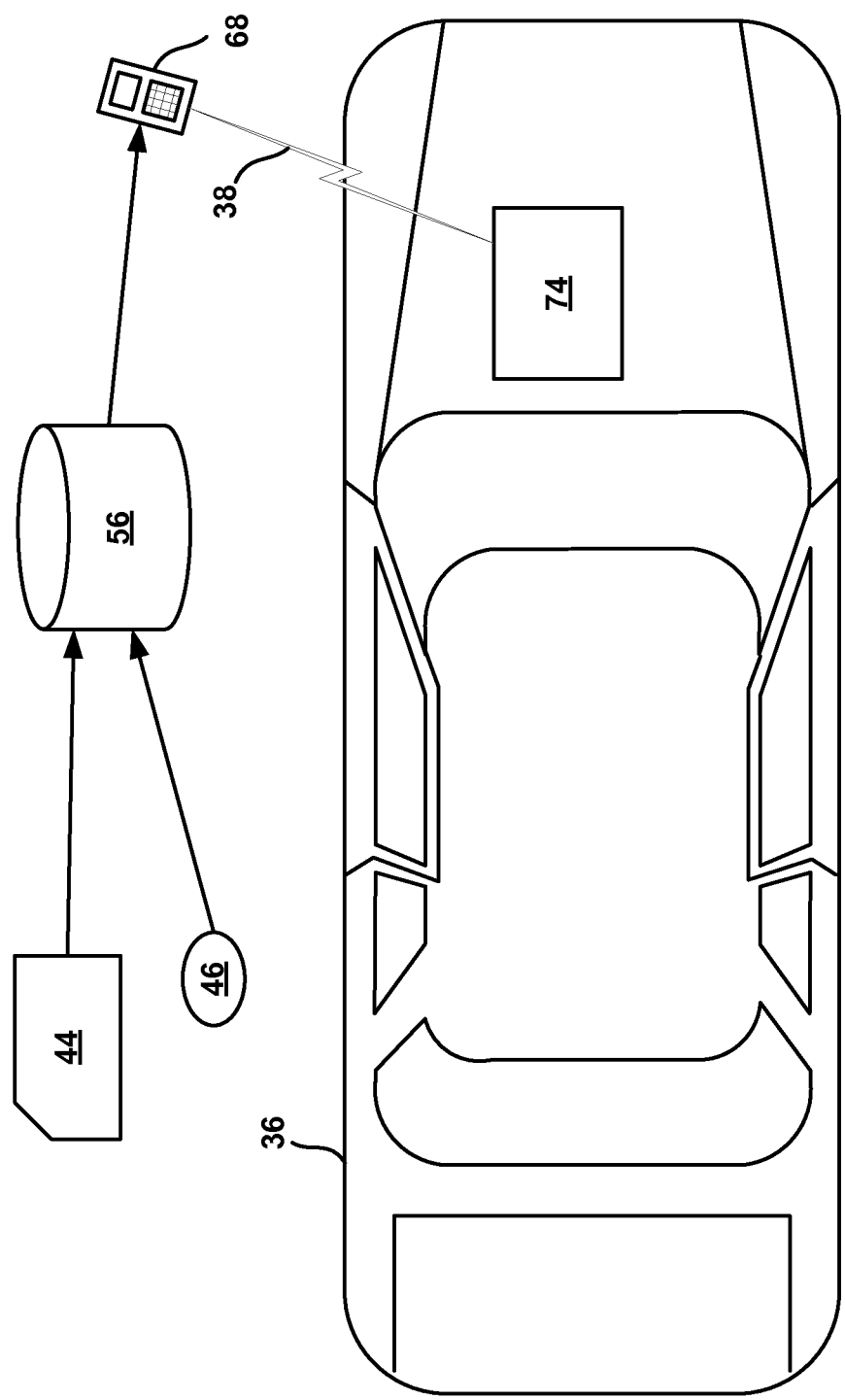
FIG. 3 is a schematic diagram showing how electronic content and a digital signature are physically delivered to a controller in a vehicle.

FIG. 3 is a schematic diagram showing how electronic content and digital signature files are physically delivered to a vehicle controller. A vehicle 36 includes the ECU 74 shown in FIG. 2 and discussed above. The ECU 74 could control the engine, transmission, chassis, body, infotainment, or other system on the vehicle 36. The content file 44 and the digital signature 46 are provided to a central database, shown here as the manufacturing database 56. The transfer of the content file 44 and the digital signature 46 to the manufacturing database 56 could take place over a company network. The manufacturing database 56 provides the content file 44 and the digital signature 46 to the programming tool 68, where this transfer could be accomplished by attaching the programming tool 68 to a computer which has access to the database 56. The programming tool 68 communicates with the ECU 74 via a connection 38, which may be wired or wireless. With the connection 38 established, the content file 44 and the digital signature 46 can be downloaded from the programming tool 68 to the ECU 74, where the bootloader can perform the security verification functions discussed previously.

The present invention proposes a technique for allowing a production controller already flashed with existing files to be flashed with developmental software and/or calibration files for testing, verification, analysis, etc. purposes without having to sign or otherwise authenticate the developmental software file and/or calibration file with a signature or other validation code to allow engineers and technicians to use the production controller for product development in a more easy, cost effective and friendly manner. As will be discussed in detail below, the technique is performed so that only a single particular controller instance is allowed to be flashed with the development software without signature, and not all controllers of the particular controller type.

Figure 4:
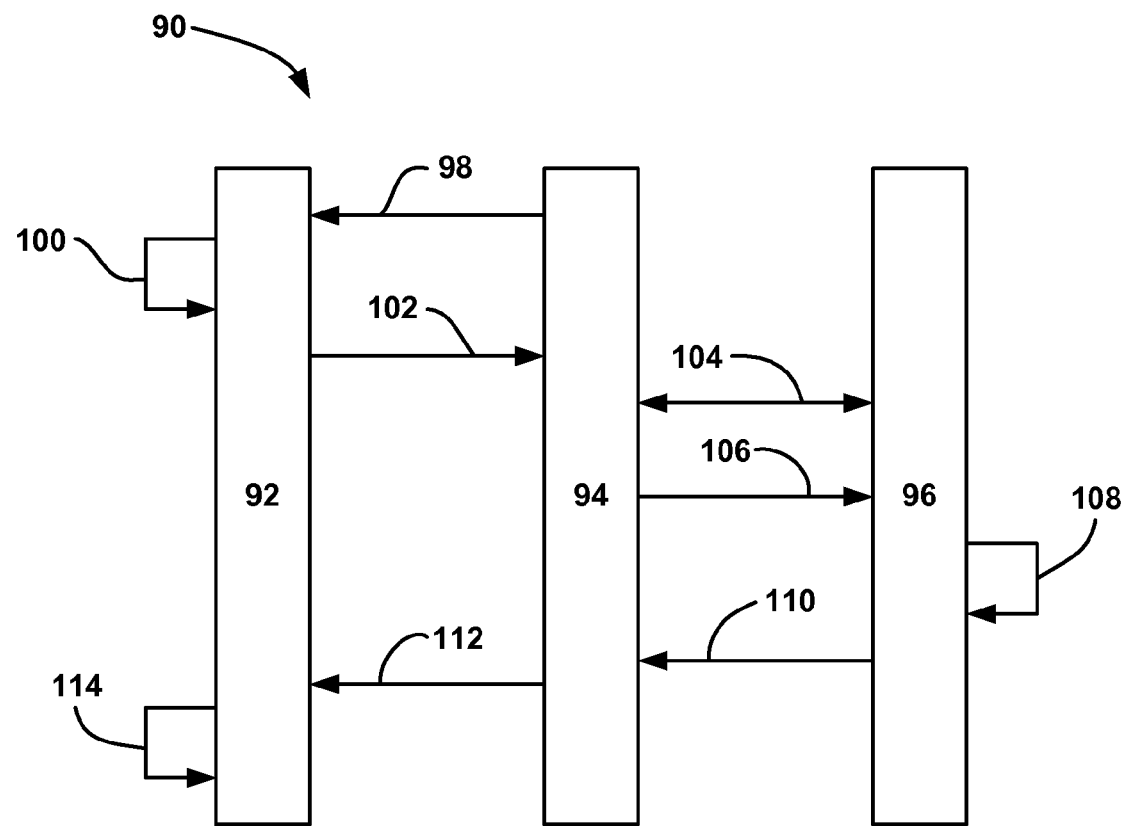
FIG. 4 is a block flow diagram showing a method for bypassing a security code of a production controller.

FIG. 4 is a flow block diagram 90 where time progress from top to bottom showing a process for the technique generally referred to above, and includes box 92 representing a secure (i.e., accepts only signed software) vehicle production ECU or controller, box 94 representing an engineer or technician wanting to use the production controller 92 for product development purposes, where the engineer 94 would use a programming tool of the type referred to above to access the controller 92, and a server 96 that represents a known, trusted and remote database or "backend" for the particular organization that is able to provide authentication, authorization and accounting services (AAA) for the particular application.

When the engineer 94 wishes to use the controller 92 (e.g., to program into the controller unsigned software and/or calibration files) the engineer 94, through the programming tool, will send a request for controller information on line 98 for purposes of disabling or by-passing the signature validation requirement or replacing the signing key used to verify digital signatures. When the controller 92 receives the request on the line 98, it proceeds to create a controller information ticket represented by line 100 and that ticket is transferred to the engineer 94 through the programming tool on line 102. The information ticket is a message that can include any unique information that identifies that particular ECU, such as module ID number, component serial number, or manufacturing traceability, and, as will be discussed in more detail below, possibly a challenge or other requirement that must be acknowledged or answered to the satisfaction of the controller 92 to over-ride or by-pass the signing requirement.

The engineer 94 then logs on to the server 96, represented by line 104, to have the controller information ticket validated and approved by the server 96, where the engineer 94 and the server 96 exchange the necessary information so that the server 96 knows that the engineer 94 is an authorized user of the server 96. The server 96 will be located at a secure facility remotely from the location of the engineer 94 and the controller 92, where the engineer 94 accesses the server 96 in any suitable manner, such as through a PC keyboard, touch screen, etc., and where the connection to the server 96 can be through any suitable secure connection, such as wireless, secure phone lines, etc. Once the engineer 94 has logged on the server 96, the engineer 94 then through the same process as logging on sends the controller information ticket to the server 96 on line 106. Based on the information provided in the controller information ticket, the server 96 creates an authorization ticket, represented by line 108, where the authorization ticket is signed by the server 96 and can be a file header with a specific module ID. It is noted that the server 96 must know the format of the file header.

Figure 5:
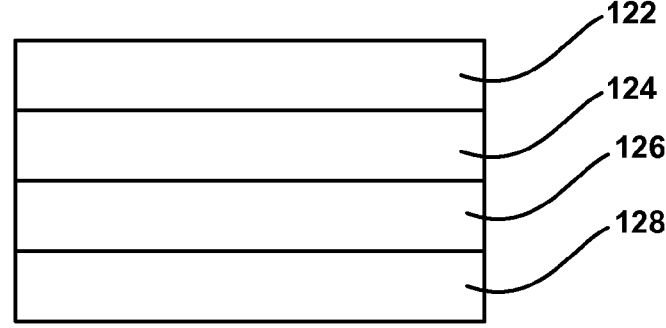
FIG. 5 is a block diagram of a memory segment of a controller.

FIG. 5 is a representation of an authorization ticket 120 of the type discussed herein that allows the controller 92 to validate that the engineer 94 is an authorized user. The server 96 generates the ticket 120 that includes the controller information at section 122 identifying the controller 92 and including the answer to the challenge question so that the authorization ticket 120 is only valid for a single specific controller 92. At section 124, the authorization ticket 120 may include a parameter that describes the purpose of why the engineer 94 wants to update the controller 92, such as by-passing the signature validation for the software file and/or calibration part, unlocking the controller 92, replacing a signature validation key, updating special parameters, etc. At section 126, the authorization ticket 120 may include a validity code that defines the life period of the ticket 120, such as a one time use, an ignition cycle, etc. At section 128, the ticket 120 may include signed information, such as a signature value, signer ID, etc.

The server 96 then sends the authorization ticket 120 to the engineer 94 on line 110 by the connection already established and the engineer 94 then sends the authorization ticket 120 to the controller 92 through the programming tool on line 112 where it is processed by the controller 92 represented by line 114. The information in the authorization ticket 120 is processed by the controller 92 to establish that the authorization ticket is valid, and sets the appropriate flag or provides the appropriate enablement scheme (e.g., to allow the engineer 94 to now install the unsigned development software file and/or calibration file on the controller 92). The authorization ticket 120 generated by the server 96 tells the controller 92 what type of information it needs to know to verify the ticket and update the controller 92. The controller 92 looks at the authorization ticket 120 and determines whether it has the appropriate signature or code and ID information that is specifically for that controller 92.

As mentioned, the controller information ticket generated by the controller 92 may include some type of challenge or other code that is included in the authorization ticket 120 generated by the server 96 so that when the engineer 94 sends the authorization ticket 120 back to the controller 92 it needs to include that particular challenge or code so that the controller 92 knows that it is not a previous authorization ticket for a different programming operation. Therefore, each time the engineer 94 wants to switch the controller 92 from production mode to development mode, he or she must get a new authorization ticket by first obtaining the controller information ticket from the controller 92. The server 92 uses the information in the controller information ticket to create the authorization ticket 120 with a proper code that allows the controller 92 to know that it has been properly validated and that the engineer 94 is an authorized user. Therefore, the information identifying that controller, a random number or other challenge identifier, and/or both the controller identification number and random number may need to be required. The advantage of only having the controller ID to obtain the authorization ticket 120 is that the engineer 94 only needs to go to the server 96 one time to get the authorization ticket for that particular controller. However, if the controller 92 is switched back into production mode, the authorization ticket without the challenge may be misused to switch the controller 92 back into production mode.

The process discussed above for over-riding the signing requirement for flashing developmental software files and/or calibration parts can set a signature or authorization by-pass flag in the controller 92 to allow the developmental software file to be flashed into the controller 92. Alternately, the procedure discussed above for over-riding the signing requirement may be used for other purposes other than flashing developmental software files and/or calibration parts onto a production controller. Assuming that the signature by-pass flag has been set, the present invention also proposes a technique for a process of how that developmental software file and/or calibration part is then flashed in the controller 92. It is also noted that the signature by-pass flag as discussed herein does not have to necessarily have to be a flag for by-passing a signature requirement, but can be a flag that is set for by-passing other authorization requirements.

Figure 6:
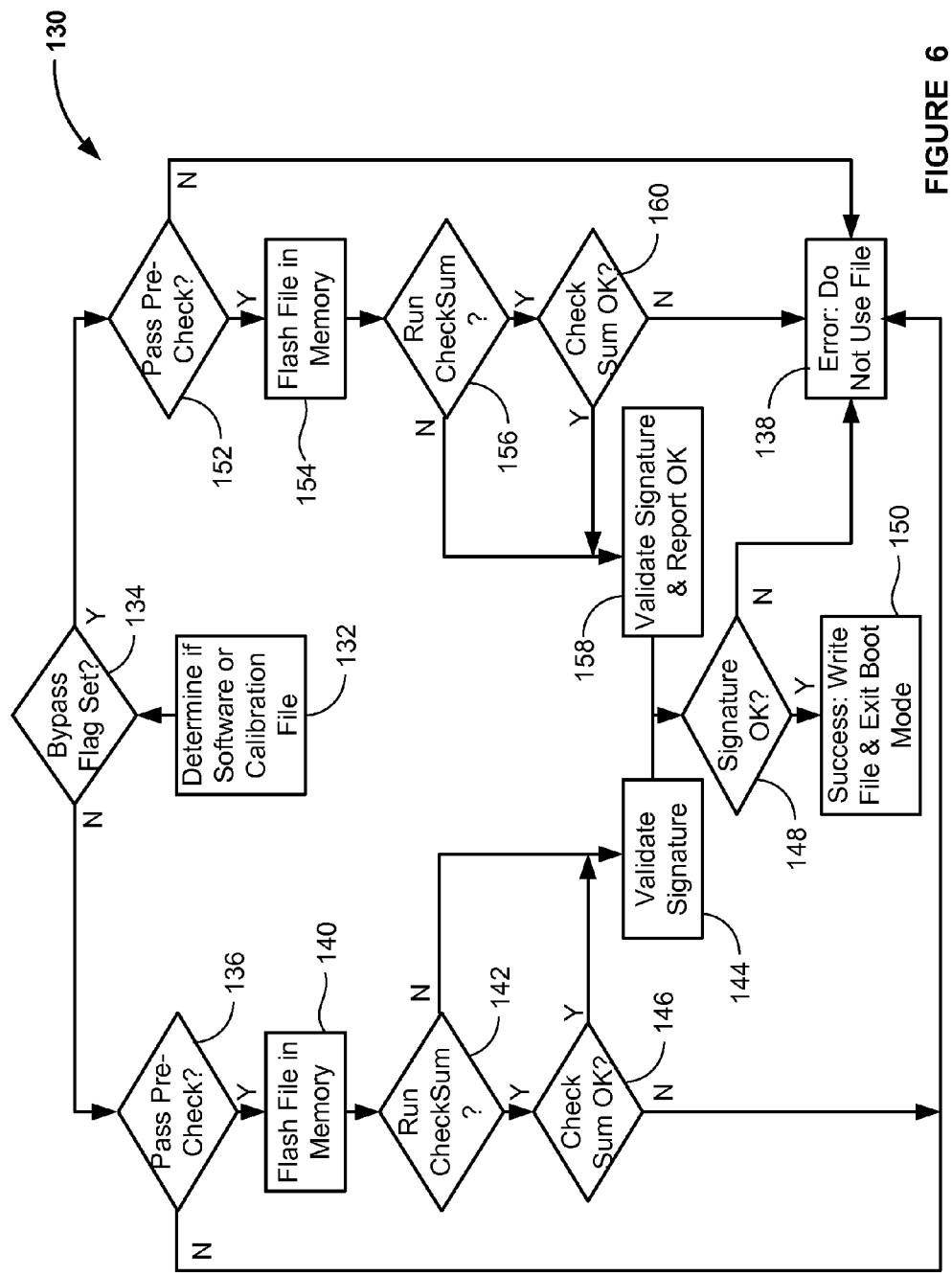
FIG. 6 is a flow chart diagram showing a process for secure flash programming of signed software parts.

FIG. 6 is a flow chart diagram 130 showing a process for allowing software files and/or calibration files to be flashed in the controller 92 for both situations of whether the signature by-pass flag has been set or not. The algorithm depicted in the flow chart diagram 130 can be used for both flashing a software file or a calibration file, where flashing of a software file or a calibration file would be independent of each other. In this regard, the algorithm first determines whether the file to be flashed is a software file or a calibration file at box 132, and then based on that determination proceeds to decision diamond 134 to determine whether the software file by-pass flag or the calibration file by-pass flag has been set or not. If the by-pass flag for the software file or the calibration file has not been set, flashing of the software file or calibration file needs to be validated using the signature verification as discussed above. Likewise, if the by-pass flag has been set, then the software file or the calibration file does not need to be validated as discussed.

If the by-pass flag has not been set, the algorithm proceeds to decision diamond 136 to perform a series of pre-checks to determine whether the software file or calibration file has the appropriate format, such as header format identification, signature version, key identification, memory address range, etc. Any pre-check suitable for a particular software file, calibration file, controller, etc. can be employed at the pre-check operation. Suitable non-limiting verifying examples include module ID check that identifies the type of file being presented to the controller, i.e., calibration or software, a controller check to determine whether compatibility address ranges to be programmed are within the ranges associated with known valid ranges for the calibration file or software file, whether a key to be used to calculate the signature of the software file or calibration file to be installed is compatible with the key in the controller, a security level of the key used to calculate the signature of the software file or calibration file to be programmed is compatible with the key security level stored in the controller, the security level of the software file or calibration file being programmed is compatible with the software security level stored in the controller, a compatibility ID is proper that determines whether the software file or calibration file to be flashed is compatible with the boot software in the controller, the target name within the file presented to the controller matches the controller, for example, improper files may be sent to the wrong controller, the expiration date of the file to be flashed, etc.

If the software file or the calibration file does not include the appropriate pre-check identifications and so forth at the pre-check step at the decision diamond 136, then the algorithm proceeds to box 138 to report an error and stays in the boot mode and the file is not flashed. If the software file or calibration file passes the pre-check step at the decision diamond 136, the algorithm proceeds to box 140 where the software file or calibration file is stored in memory while it is being authenticated and validated. The flashing process is performed for the particular file, and includes erasing software or calibration file presence patterns, erasing flash segments, writing the file to the flash, etc., all well understood processes by those skilled in the art. The files to be installed may be flashed into memory before they are validated because of RAM memory limitations in the controller for the processing of the signature, checksum, etc. as discussed herein. Thus, the bootloader flashes the software or calibration file into the non-volatile memory, and only uses the flashed software or calibration file if it is determined to be valid, where it otherwise erases the software or calibration file if it is not. The presence patterns are well known digital messages that verify a software file or calibration file. Particularly, the bootloader can determine that the software and/or calibration files are present and valid by checking for the occurrence of specific digital patterns, known as presence patterns within the software and/or calibration file memory blocks. The presence patterns can be provided at any suitable location in the memory section associated with the software or calibration file, and is typically at the end of the memory section.

Once the flashing process is performed, the algorithm determines whether a checksum process should be performed or by-passed at decision diamond 142. As is well understood by those skilled in the art, the checksum is a high level validation process to insure that the flashing process was not corrupted and everything that was meant to be flashed was. As is well understood by those skilled in the art, some flashing processes may want to employ the checksum process for validation purposes and other flashing processes may not. If the checksum process is not to be by-passed, then the algorithm determines whether the checksum validation process indicates the flashing process was valid, and if not, proceeds to the box 138 to report the error and stay in the boot mode. If the checksum process is by-passed at the decision diamond 142 or is valid at the decision diamond 146, then the algorithm validates the signature over the flashed memory, such as discussed above, at box 144 to determine whether the installed software file or calibration file is authentic and valid. The algorithm determines whether the signature is valid at the decision diamond 148, and if not, proceeds to the box 138 to report the error and stay in the boot mode. Otherwise, the algorithm writes the software file or the calibration file presence pattern, reports that the flash was successful and exits the boot mode if all of the presence patterns are valid at box 150.

If the by-pass flag is set at the decision diamond 134, meaning that the software file or calibration file to be flashed does not need to be validated by its signature or other security code, the algorithm still performs the pre-check process at decision diamond 152 as discussed above, and if the pre-check does not pass, the algorithm moves to the box 138 to report the error and stay in the boot mode. It is noted that the pre-check process may be different based on whether the by-pass flag is set or not, where the pre-check process would likely be less robust if the by-pass flag is set. Therefore, if some of the pre-check operations that are not part of the pre-check test if the by-pass flag is set are not satisfied, the algorithm will still proceed to box 154 for flashing the software.

If the pre-check operation passes at the decision diamond 152, the algorithm erases the presence patterns and flash segments at the box 154 in the same manner as was done at the box 140, determines if the checksum should be by-passed at the decision diamond 156 in the same manner as was done at the decision diamond 142, and determines if the checksum is valid at decision diamond 160 in the same manner as was done at the decision diamond 146. In the present case, where the by-pass flag has been set, the algorithm still goes through the process to determine whether the signature is valid at box 158, and reports that the signature is valid to the signature valid decision diamond 148 whether it is or isn't. In other words, even if the by-pass flag is set, the algorithm still tries to authenticate the signature and reports it to be valid regardless of knowing that it is not. The algorithm calculates whether the signature is valid while it is in the developmental by-pass mode mainly for timing reasons in that the signature validation process takes some amount of time which needs to be replicated in the developmental process.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for securely installing a file on a controller, said method comprising:
    determining whether a by-pass flag has been set in the controller that determines whether a file validation procedure is required to install the file;
    performing a pre-check operation to determine whether predetermined parameters of the file have been satisfied, where a number of the predetermined parameters to be satisfied if the by-pass flag is set is less than a number of the predetermined parameters to be satisfied if the by-pass flag has not been set;
    installing the file into a memory in the controller if the pre-check operation has been satisfied;
    determining whether the file has an authorized security code;
    indicating that the authorized security code is present if the by-pass flag is set and the file does or does not include the authorized security code, or if the by-pass flag is not set and the file does include the authorized security code; and
    allowing the file to be installed if the authorized security code has been indicated as being present.

2. The method according to claim 1 wherein performing a pre-check operation to determine whether predetermined parameters of the file have been satisfied includes performing one or more of verifying a header format identification, verifying a signature version, verifying a key identification and security level, verifying a memory address range, verifying a controller identification number, verifying a security level of the file, verifying that a compatibility identification number is proper, identifying whether the file to be installed is for the controller, and verifying an expiration date of the file.

3. The method according to claim 1 wherein determining whether the file has an authorized security code includes determining whether the file has a valid signature associated with asymmetric key cryptography encoding that employs digital signatures and public and private keys.

4. The method according to claim 1 wherein installing the file into a memory in the controller includes erasing a presence pattern that identifies that the file is present and valid.

5. The method according to claim 1 further comprising performing a checksum operation after installing the file into the memory of the controller, but before determining whether the file has an authorized security code.

6. The method according to claim 1 wherein the file can be a software file or a calibration file, and wherein determining whether the by-pass flag has been set includes determining whether a separate by-pass flag has been set for either the software file or the calibration file.

7. The method according to claim 1 wherein the by-pass flag is set to install a developmental file on a production controller without having to authorize the file.

8. The method according to claim 1 wherein the controller is an electronic control unit (ECU) for a vehicle.

9. A method for securely installing a software file or calibration file on a vehicle electronic control unit (ECU), said method comprising:
    determining whether a by-pass flag for either the software file or the calibration file has been set in the ECU that determines whether a file validation procedure is required to install the file;
    performing a pre-check operation to determine whether predetermined parameters of the file have been satisfied, wherein performing a pre-check includes performing a pre-check operation where the number of parameters to be satisfied if the by-pass flag is set is less than the number of predetermined parameters to be satisfied if the by-pass flag has not been set;
    installing the file into a memory in the controller if the pre-check operation has been satisfied;
    determining whether the file has an authorized signature;
    indicating that the authorized signature is present if the by-pass flag is set and the file does or does not include the authorized signature, or if the by-pass flag is not set and the file does include the authorized signature; and
    allowing the file to be installed if the authorized signature has been indicated as being present.

10. The method according to claim 9 wherein installing the file into a memory in the controller includes erasing a presence pattern that identifies that the file is present and valid.

11. A system for securely installing a file on a controller, said system comprising:
    means for determining whether a by-pass flag has been set in the controller that determines whether a file validation procedure is required to install the file;
    means for performing a pre-check operation to determine whether predetermined parameters of the file have been satisfied, where a number of the predetermined parameters to be satisfied if the by-pass flag is set is less than a number of the predetermined parameters to be satisfied if the by-pass flag has not been set;
    means for installing the file into a memory in the controller if the pre-check operation has been satisfied;
    means for determining whether the file has an authorized security code;
    means for indicating that the authorized security code is present if the by-pass flag is set and the file does or does not include the authorized security code, or if the by-pass flag is not set and the file does include the authorized security code; and
    means for allowing the file to be installed if the authorized security code has been indicated as being present.

12. The system according to claim 11 wherein the means for performing a pre-check operation to determine whether predetermined parameters of the file have been satisfied performs one or more of verifying a header format identification, verifying a signature version, verifying a key identification and security level, verifying a memory address range, verifying controller identification number, verifying a security level of the file, verifying that a compatibility identification number is proper, identifying whether the file to be installed is for the controller, and verifying an expiration date of the file.

13. The system according to claim 11 wherein the means for determining whether the file has an authorized security code determines whether the file has a valid signature associated with asymmetric key cryptography encoding that employs digital signatures and public and private keys.

14. The system according to claim 11 wherein the means for installing the file into a memory in the controller erases a presence pattern that identifies the file is present and valid.

15. The system according to claim 11 further comprising means for performing a checksum operation after installing the file into the memory of the controller, but before determining whether the file has an authorized security code.

16. The system according to claim 11 wherein the file can be a software file or a calibration file, and wherein determining whether the by-pass flag has been set includes separately determining whether a by-pass file has been set depending on whether the file is a software file or a calibration file.

17. The system according to claim 11 wherein the by-pass flag is set to install a developmental file on a production controller without having to authorize the file.

18. The system according to claim 11 wherein the controller is an electronic control unit (ECU) for a vehicle.

* * * * *